United States Patent
Sudo

(10) Patent No.: US 8,321,743 B2
(45) Date of Patent: Nov. 27, 2012

(54) INFORMATION STORAGE MEDIUM AND INFORMATION STORAGE MEDIUM PROCESSING APPARATUS

(75) Inventor: Kiyohito Sudo, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1113 days.

(21) Appl. No.: 12/208,005

(22) Filed: Sep. 10, 2008

(65) Prior Publication Data

US 2009/0240978 A1 Sep. 24, 2009

(30) Foreign Application Priority Data

Mar. 18, 2008 (JP) ................ 2008-070319

(51) Int. Cl.
*H04L 1/14* (2006.01)
(52) U.S. Cl. ............... 714/750; 714/758; 714/763
(58) Field of Classification Search .......... 714/763, 714/758, 750
See application file for complete search history.

(56) References Cited

U.S. PATENT DOCUMENTS

| | | | |
|---|---|---|---|
| 6,012,143 A | 1/2000 | Tanaka | |
| 6,655,588 B2 | 12/2003 | Fukazawa | |
| 7,164,344 B2 | 1/2007 | Deguchi et al. | |
| 2004/0167865 A1* | 8/2004 | Alemany | 707/1 |
| 2006/0180666 A1 | 8/2006 | Yamashita et al. | |
| 2007/0271495 A1* | 11/2007 | Shaeffer et al. | 714/763 |

FOREIGN PATENT DOCUMENTS

JP 2002-342734 11/2002

OTHER PUBLICATIONS

Singapore Search Report dated Mar. 13, 2009 for Appln. No. 200806577-3.

* cited by examiner

*Primary Examiner* — Guy Lamarre
(74) *Attorney, Agent, or Firm* — Pillsbury Winthrop Shaw Pittman, LLP

(57) ABSTRACT

An information storage medium according to one embodiment of the invention includes a card main body embedded with a module, in which the module includes a communication control unit for interpreting received data, and selectively executing normal processing for returning response data to a transmission source of the received data based on a determination result indicating that the received data is correct data complying with a predetermined communication protocol, and error processing for returning an error to the transmission source of the received data based on a determination result indicating that the received data is error data.

4 Claims, 4 Drawing Sheets

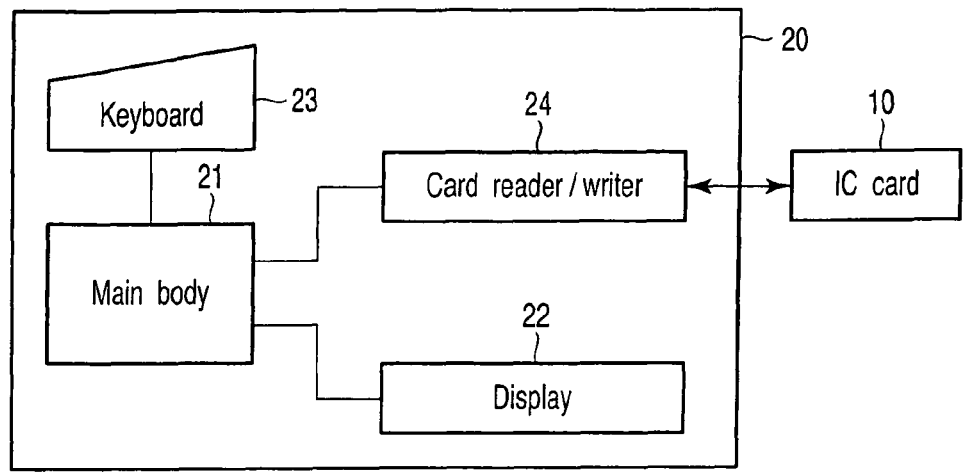
F I G. 1
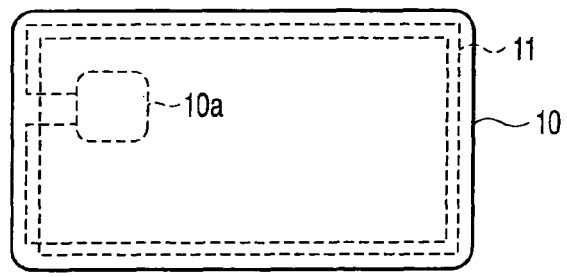
F I G. 2
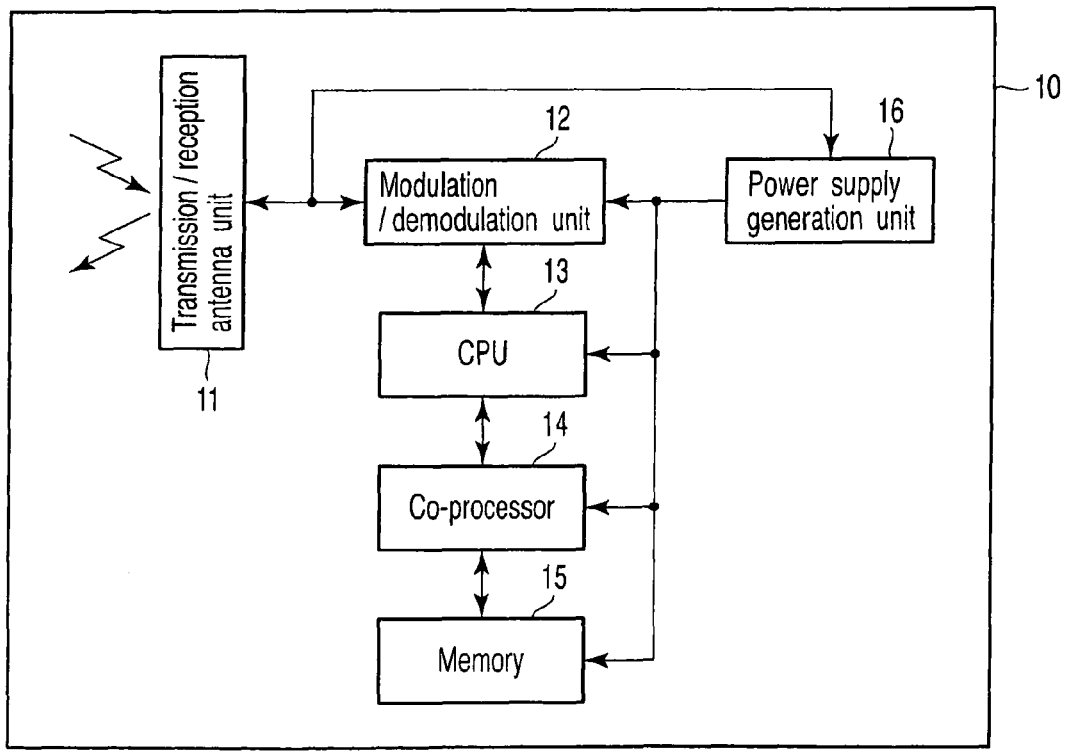
F I G. 3

(1) Change frequency of subcarrier (2) Change encoding

BPSK (Binary Phase Shift Keying), NRZ encoding

OOK (On / Off Keying), Manchester encoding

ASK (Amplitude Shift Keying), Manchester encoding

INFORMATION STORAGE MEDIUM AND INFORMATION STORAGE MEDIUM PROCESSING APPARATUS

CROSS-REFERENCE TO RELATED APPLICATIONS

This application is based upon and claims the benefit of priority from prior Japanese Patent Application No. 2008-070319, filed Mar. 18, 2008, the entire contents of which are incorporated herein by reference.

BACKGROUND OF THE INVENTION

1. Field of the Invention

The present invention relates to an information storage medium called an IC card, which incorporates an IC (Integrated Circuit) chip having, e.g., control elements such as a CPU, ROM, RAM, EEPROM, and the like. Furthermore, the present invention relates to an information storage medium processing apparatus called an IC card reader/writer, which records data on such information storage medium and reads out data from the information storage medium.

2. Description of the Related Art

IC cards are used in various fields not only for settlements of business transactions such as credit cards, commuter passes, and the like, but also as ID cards such as employee ID cards, membership cards, insurance cards, and the like. This is because the IC cards can implement various functions since they comprise control elements such as a CPU, ROM, RAM, EEPROM, and the like, and are hard to forge to greatly improve security, compared to conventional magnetic cards.

Jpn. Pat. Appln. KOKAI Publication No. 2002-342734 discloses a technique associated with an IC card. The IC card operates based on commands transmitted from an external apparatus (IC card reader/writer). For example, upon reception of a command transmitted from the external apparatus, the IC card confirms if the received command is a command registered in a command control table. If the received command is a registered command, the IC card executes processing based on the received command, and returns response data.

ISO/IEC14443 specifies a communication protocol between the command data and response data. That is, ISO/IEC14443 specifies a communication protocol required when a non-contact-IC card reader/writer transmits command data to a non-contact IC card, the non-contact IC card receives the command data and executes processing corresponding to the received command data, and the non-contact IC card returns a processing result as response data to the non-contact IC card reader/writer.

Upon reception of data that does not comply with the ISO/IEC14443 communication protocol, the non-contact IC card falls into a non-response state since it cannot execute processing corresponding to the received data. When the non-contact IC card receives data complying with the ISO/IEC14443 communication protocol but cannot reconstruct the received error due to some communication error, the non-contact IC card also falls into a non-response state since it cannot execute processing corresponding to the received data.

The non-contact IC card reader/writer waits for response data from the non-contact IC card until an elapse of a maximum reception waiting time, which is set in advance, and determines a non-response error after the elapse of the waiting time. That is, when the non-contact IC card falls into a non-response state, as described above, the non-contact IC card reader/writer determines a non-response error after the elapse of the maximum reception waiting time, resulting in inefficiency.

BRIEF SUMMARY OF THE INVENTION

It is an object of the present invention to provide an information storage medium and an information storage medium processing apparatus, which can prevent a communication efficiency drop.

An information storage medium according to one embodiment of the invention comprises a card main body embedded with a module, in which the module comprises communication control means for interpreting received data, and selectively executing normal processing for returning response data to a transmission source of the received data based on a determination result indicating that the received data is correct data complying with a predetermined communication protocol, and error processing for returning an error to the transmission source of the received data based on a determination result indicating that the received data is error data.

An information storage medium processing apparatus according to one embodiment of the invention comprises communication means for transmitting data to an information storage medium, and receiving response data from the information storage medium, and communication control means for, when the response data cannot be received within a predetermined period of time after transmission of the data or when an error is received before an elapse of the predetermined period of time after transmission of the data, determining a communication error, and re-transmitting the data to the information storage medium.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic block diagram showing the arrangement of an IC card system according to an embodiment of the present invention;

FIG. 2 is a schematic view of a non-contact IC card (information storage medium) according to the embodiment;

FIG. 3 is a schematic block diagram of the non-contact IC card according to the embodiment;

DETAILED DESCRIPTION OF THE INVENTION

Figure 4:
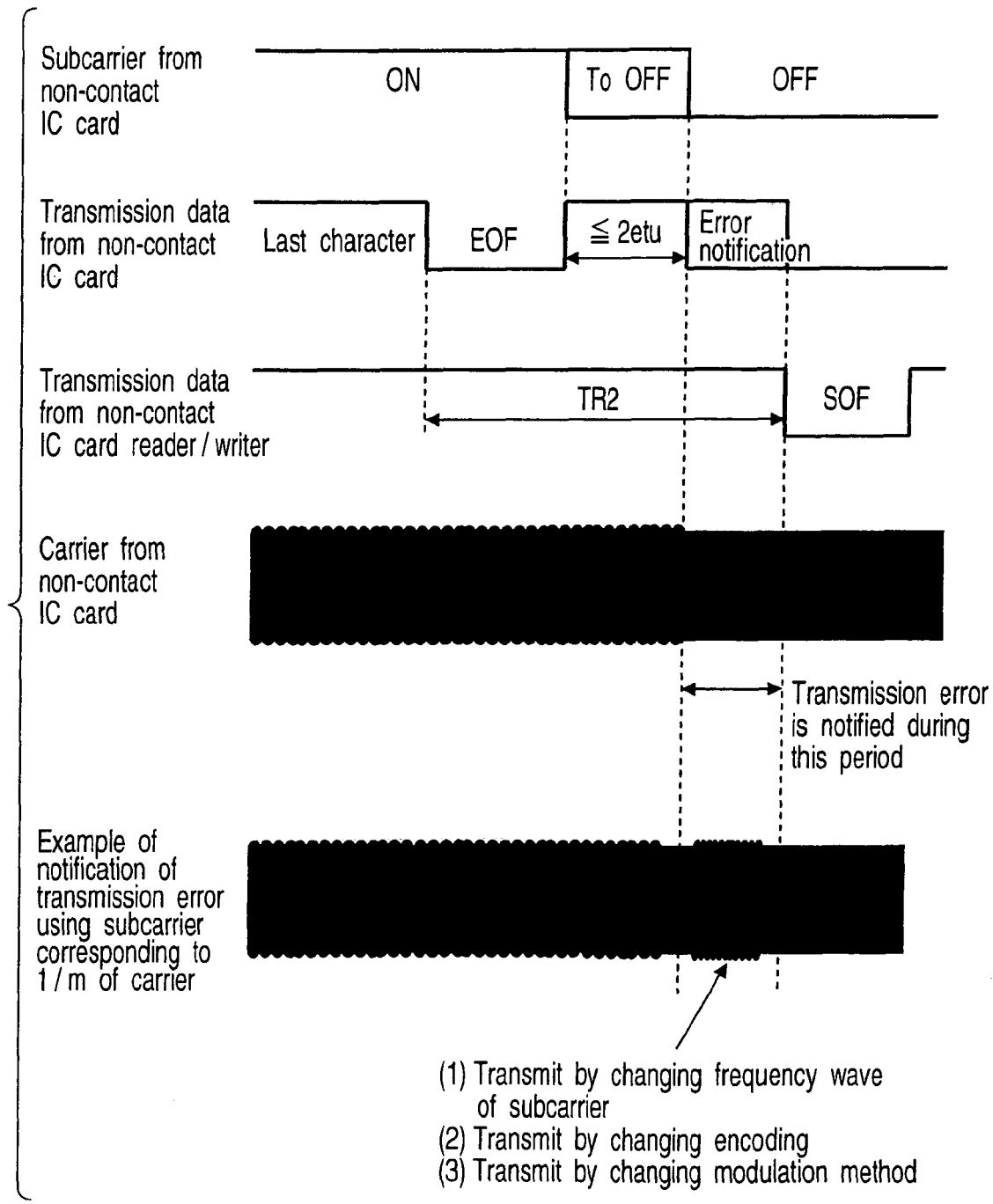
FIG. 4 is a chart for explaining a transmission error notification timing according to the embodiment.

An embodiment of the present invention will be described hereinafter with reference to the accompanying drawings.

FIG. 1 is a schematic block diagram showing the arrangement of an IC card system. As shown in FIG. 1, the IC card system comprises a terminal 20 and a non-contact IC card (information storage medium) 10. The terminal 20 comprises a main body (main control unit) 21, display 22, keyboard 23, and non-contact IC card reader/writer 24. The terminal 20 can communicate with the non-contact IC card 10. The terminal 20 transmits data to the non-contact IC card 10, and receives data from the non-contact IC card 10.

The main body 21 instructs to transmit or re-transmit command data, and confirms completion of command processing based on reception of response data. The display 22 displays the communication result and the like with the non-contact IC card 10. The keyboard 23 is used to input characters, numerals, and the like to the main body 21. The card reader/writer 24 communicates with the non-contact IC card 10.

Note that the non-contact IC card 10 may support a contact communication function. In this case, the card reader/writer 24 also supports the contact communication function.

FIG. 2 shows an overview of a non-contact IC card (information storage medium) according to the embodiment of the present invention. As shown in FIG. 2, the non-contact IC card 10 is formed of a card main body (plastic card), which comprises an IC chip 10a (module) and transmission/reception antenna unit 11. This non-contact IC card 10 notifies the non-contact IC card reader/writer 24 of an error when a communication error has occurred, thus preventing a communication efficiency drop.

As shown in FIG. 3, the non-contact IC card 10 comprises the transmission/reception antenna unit 11, modulation/demodulation unit 12, CPU 13, co-processor 14, nonvolatile memory 15, and power supply generation unit 16. For example, the IC chip 10a includes the modulation/demodulation unit 12, CPU 13, co-processor 14, nonvolatile memory 15, and power supply generation unit 16.

The transmission/reception antenna unit 11 is an antenna used to exchange data with the non-contact IC card reader/writer 24. The modulation/demodulation unit 12 modulates transmission data to be transmitted to the non-contact IC card reader/writer 24, and demodulates reception data received from the non-contact IC card reader/writer 24. The CPU 13 executes various kinds of data processing and overall control. The co-processor 14 encrypts various data. The nonvolatile memory is an EEPROM or the like, and stores various data. The power supply generation unit 16 generates a stable DC voltage by rectifying and smoothing a received power wave, and supplies the generated voltage to respective units as an operation voltage.

A communication protocol of ISO/IEC14443TypeB will be described below.

When the non-contact IC card 10 enters an operation magnetic field range radiated by the non-contact IC card reader/writer 24, it is activated within 5 ms, and is set in an idle state.

When the non-contact IC card 10 (CPU 13) normally receives an initial response REQB (Request Command TypeB) or WUPB (Wake Up command TypeB) from the non-contact IC card reader/writer 24, it sends an ATQB (Answer To Request command TypeB) to the non-contact IC card reader/writer 24. The REQB and WUPB commands are used to detect whether or not a non-contact IC card of ISO/IEC14443TypeB exists within the operation magnetic field.

The non-contact IC card reader/writer 24 transmits an ATTRIB command to select the non-contact IC card 10, and receives Answer to ATTRIB as a response. After that, the non-contact IC card reader/writer 24 enters respective command processes.

The amplitude of data to be transmitted from the non-contact IC card reader/writer 24 to the non-contact IC card 10 is modulated about 10% with respect to a carrier (13.56 MHz). The NRZ encoding method is applied to this data. The phase of response data to be transmitted from the non-contact IC card 10 to the non-contact IC card reader/writer 24 is modulated by a subcarrier (847.5 kHz) corresponding to $1/16$ (=1/n) of the aforementioned carrier. The NRZ encoding method is also applied to this response data.

When the non-contact IC card 10 (CPU 13) receives a data format which does not comply with the ISO/IEC14443TypeB protocol and determines a transmission error during reception of command data from the non-contact IC card reader/writer 24, it notifies the non-contact IC card reader/writer 24 of a transmission error. Or when the non-contact IC card 10 (CPU 13) receives data which complies with the ISO/IEC14443TypeB protocol but suffers partial losses due to the influence of disturbance noise or the like, and determines a transmission error during reception of command data from the non-contact IC card reader/writer 24, it notifies the non-contact IC card reader/writer 24 of a transmission error.

For example, the nonvolatile memory 15 of the non-contact IC card 10 stores information associated with a data format that complies with the ISO/IEC14443TypeB protocol. The CPU 13 of the non-contact IC card 10 interprets received data, and checks based on the information stored in the nonvolatile memory 15 if the received data is correct data that complies with the ISO/IEC14443TypeB protocol. If the CPU 13 determines that the received data is correct data, it returns response data to this received data (normal processing). If the CPU 13 determines that the received data is error data which does not comply with the ISO/IEC14443TypeB protocol or that the received data is error data that suffers partial losses, it notifies a transmission error to this received data (error processing). Note that the CPU 13 determines that the received data is error data which does not comply with the ISO/IEC14443TypeB protocol when the data format (the modulation frequency, encoding method, ratio of symbols 0 and 1, and the like) of the received data is different from that (the modulation frequency, encoding method, ratio of symbols 0 and 1, and the like) complying with the ISO/IEC14443TypeB protocol.

A transmission error notification timing by the CPU 13 will be described below.

Assume that a transmission error occurs while the non-contact IC card 10 receives first command data transmitted from the non-contact IC card reader/writer 24. Data transmitted from the non-contact IC card 10 to the non-contact IC card reader/writer 24 is assumed as first data, and second command data to be transmitted next to the first command data from the non-contact IC card reader/writer 24 to the non-contact IC card 10 is assumed as second data.

For example, as shown in FIG. 4, a transmission error is notified during the period (TR2) from the leading end of the last part (EOF: End of Frame) of the first data to that of the frontmost part (SOF: Start of Frame) of the second data. That is, the transmission error is notified during the period of the last part of the first data or within a predetermined period (2etu) from the trailing end of the last part of the first data.

More preferably, the transmission error is notified within a period after waiting for an elapse of another predetermined period (2etu) from the trailing end of the last part of the first data until the leading end of the frontmost part of the second data. Alternatively, the transmission error may be notified immediately after an elapse of the predetermined period (2etu) from the trailing end of the last part of the first data. The reason for this is as follows.

Within an EOF period in the period TR2 shown in FIG. 4, the non-contact IC card 10 transmits a Low level signal to the non-contact IC card reader/writer 24 between 10etu and 11etu. "1etu" is defined by: 1etu (Elementary Time Unit)=128/fc fc=13.56 MHz A subcarrier (847.5 kHz) goes OFF within 2etu after an elapse of the EOF period. Since the period from OFF of the subcarrier to the leading end of the SOF is a non-modulated period, a stable subcarrier (stable period) is output. During this stable period, the non-contact IC card 10 notifies the non-contact IC card reader/writer 24 of the transmission error. As a result, the non-contact IC card reader/writer 24 can easily demodulate and decode data of the notified transmission error.

Note that the case has been described above wherein the transmission error is notified within a period after waiting for an elapse of the predetermined period (2etu) from the leading end of the last part of the first data until the leading end of the frontmost part of the second data. Alternatively, the transmission error may be notified before the leading end of the last part (EOF) of the first data.

Figure 8:
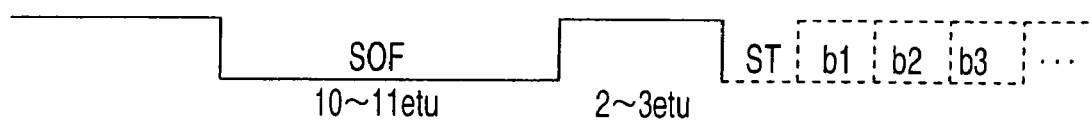
FIG. 8 is a chart for explaining a method of detecting the front most part (SOF) of transmission data from a non-contact IC card reader/writer according to the embodiment.

Note that the non-contact IC card 10 detects the frontmost part (SOF) of transmission data from the non-contact IC card reader/writer 24 as follows. As shown in FIG. 8, the period of the SOF transmitted from the non-contact IC card reader/writer 24 is continuous "L (Low)" level. The non-contact IC card 10 recognizes a signal of continuous "L" level as the SOF as a result of demodulation of the received data (the SOF continues for 10etu to 11etu). After that, "H (High)" level data continues for 2etu to 3etsu, and the non-contact IC card 10 recognizes the next "L" level data as a start bit and fetches data.

The method of transmitting transmission error notification data by the CPU 13 will be described below.

The phase of transmission error notification data is modulated by the subcarrier (847.5 kHz) corresponding to 1/16 (=1/n) of the carrier. As a result, the transmission error notification data complies with ISO/IEC14443TypeB, and the non-contact IC card reader/writer 24 can demodulate the received transmission error notification data.

Figure 5:
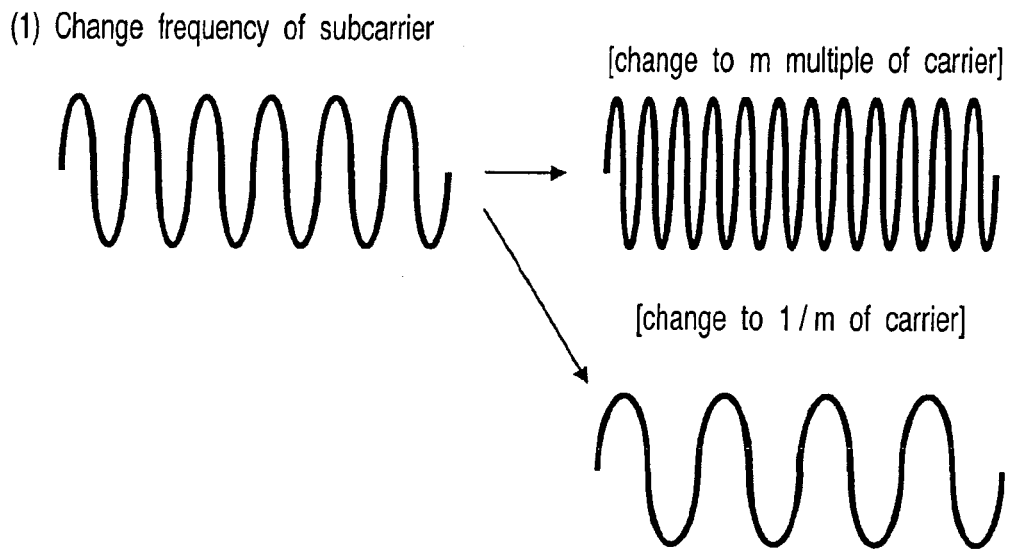
FIG. 5 is a view showing a state in which transmission error notification data is transmitted by changing the frequency wave of a subcarrier according to the embodiment.
Figure 6:
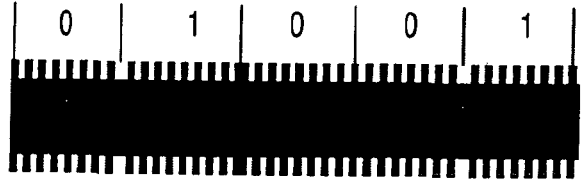
FIG. 6 is a view showing a state in which transmission error notification data is transmitted by changing an encoding method according to the embodiment.
Figure 6:
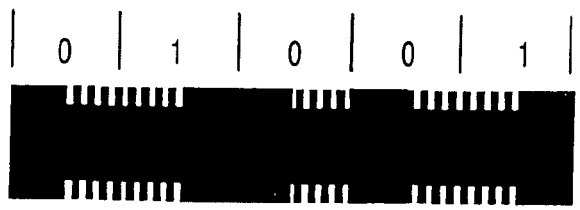
Figure 6:
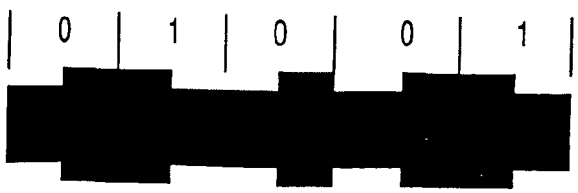
Figure 7:
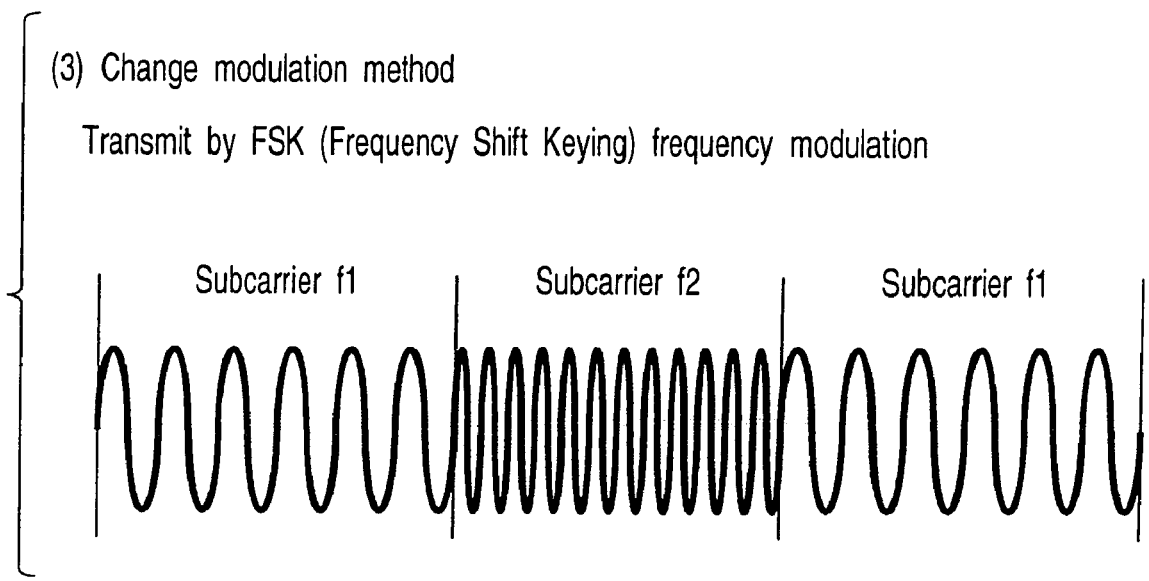
FIG. 7 is a view showing a state in which transmission error notification data is transmitted by changing a modulation method according to the embodiment.

As shown in FIGS. 4 and 5, the transmission error notification data may be transmitted by changing the frequency wave of the subcarrier. Also, as shown in FIGS. 4 and 6, the transmission error notification data may be transmitted by changing an encoding method. Furthermore, as shown in FIGS. 4 and 7, the transmission error notification data may be transmitted by changing a modulation method.

FIG. 5 shows an example in which transmission error notification data is transmitted by changing a modulation frequency. For example, the transmission error notification data may be transmitted using, e.g., a subcarrier (6.78 MHz, 3.39 MHz, or 1.695 MHz) corresponding to 1/m (m=2, 4, or 8) of the carrier of 13.56 MHz.

Since the non-contact IC card 10 generates a subcarrier by frequency-dividing by 1/m (m=2, 4, or 8) of the carrier, a circuit for modulating the transmission error notification data can be easily implemented.

Alternatively, the transmission error notification data may be transmitted using a subcarrier corresponding to an m multiple of the carrier of 13.56 MHz.

FIG. 6 shows an example in which transmission error notification data encoded by an encoding method different from the NRZ encoding method is transmitted. ISO/IEC14443TypeB specifies that data to be transmitted from the non-contact IC card 10 to the non-contact IC card reader/writer 24 is to be encoded by the NRZ encoding method. By contrast, transmission error notification data encoded by the Manchester encoding method may be transmitted, as shown in FIG. 6.

With the NRZ encoding method, a signal is at Low level during the period of data 0, and is at High level during the period of data 1. With the Manchester encoding, a signal changes from High to Low for data 0, and changes from Low to High for data 1.

The operation of the terminal 20 will be described below. The non-contact IC card reader/writer 24 of the terminal 20 transmits command data to the non-contact IC card 10, waits for response data from the non-contact IC card 10, and receives the response data from the non-contact IC card 10. The main body 21 of the terminal 20 confirms completion of processing of the transmitted command based on reception of the response data. Furthermore, when the main body 21 cannot receive the response data within a predetermined period of time after transmission of the command data, or when the main body 21 receives an error before an elapse of the predetermined period of time after transmission of the command data, it determines a communication error, and instructs to re-transmit command data to the non-contact IC card 10.

In this way, the terminal 20 can re-transmit a command to the non-contact IC card 10 without waiting for a maximum reception waiting time. As a result, the data transmission/reception time can be shortened, and communications can be speeded up.

When the non-contact IC card 10 cannot understand transmission data from the non-contact IC card reader/writer 24, it cannot notify the non-contact IC card reader/writer 24 of a transmission error. In this case, the terminal 20 waits for an elapse of the maximum reception waiting time, and starts the next processing based on no response returned from the non-contact IC card 10.

The non-contact IC card 10 cannot understand transmission data from the non-contact IC card reader/writer 24 in, e.g., the following two cases. In the first case, the non-contact IC card 10 exists outside a communication area (operation area) of a radio wave generated by the non-contact IC card reader/writer 24. In the second case, the non-contact IC card 10 exists near the boundary between the communication area and a non-communication area, and is deactivated due to power shortage after it returns an initial response to the non-contact IC card reader/writer 24.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information storage medium comprising:
a card main body embedded with a module, in which the module comprises:
communication control means for interpreting received data, and selectively executing normal processing for returning response data to a transmission source of the received data based on a determination result indicating that the received data is correct data, and error processing for returning an error to the transmission source of the received data based on a determination result indicating that the received data is error data, wherein the communication control means determines that the received data is the correct data which complies with the predetermined communication protocol when the received data format of the received data coincides with a predetermined data format of the predetermined communication protocol, the communication control means determines that the received data is the error data which does not comply with the predetermined communication protocol when the received data format of the received data is different from the predetermined data format of the predetermined communication protocol, the communication control means determines, as the error data, the received data which suffers a partial loss, the communication control means returns the error during a period from a leading end of a last part of transmission data to be transmitted to the transmission source of the received data to a leading end of a frontmost part of next transmission data to be transmitted from the transmission source, wherein the communication control means:

transmits the transmission data using a subcarrier of a first frequency corresponding to 1/n (n: being a natural number) of a carrier of a second frequency, stops transmission of the subcarrier within a predetermined period starting from the trailing end of a rearmost part of the transmission data, and returns the error within a period after an elapse of the predetermined period until the leading end of the frontmost part of the next transmission data.

2. The medium according to claim 1, wherein the communication control means transmits the error using a third frequency of the subcarrier corresponding to 1/m (m≠n, m: being a natural number) of the second frequency of the carrier.

3. The medium according to claim 1, wherein the communication control means transmits the transmission data by a first encoding method, and transmits the error by a second encoding method different from the first encoding method.

4. An information storage medium comprising:

a card main body embedded with a module, in which the module comprises:

communication control means for interpreting received data, and selectively executing normal processing for returning response data to a transmission source of the received data based on a determination result indicating that the received data is correct data, and error processing for returning an error to the transmission source of the received data based on a determination result indicating that the received data is error data, wherein the communication control means determines that the received data is the correct data which complies with the predetermined communication protocol when the received data format of the received data coincides with a predetermined data format of the predetermined communication protocol, the communication control means determines that the received data is the error data which does not comply with the predetermined communication protocol when the received data format of the received data is different from the predetermined data format of the predetermined communication protocol, the communication control means determines, as the error data, the received data which suffers a partial loss, the communication control means returns the error during a period from a leading end of a last part of transmission data to be transmitted to the transmission source of the received data to a leading end of a frontmost part of next transmission data to be transmitted from the transmission source, wherein the communication control means:

transmits the transmission data using a subcarrier of a first frequency corresponding to 1/n (n: being a natural number) of a carrier of a second frequency, stops transmission of the subcarrier within a predetermined period, the predetermined period being 2 elementary time units, where an elementary time unit is equal to 128/fc (fc: being the carrier frequency) starting from the trailing end of a rearmost part of the transmission data, and returns the error within a period after an elapse of the predetermined period until the leading end of the frontmost part of the next transmission data.

\* \* \* \* \*